GILBERT & AMES.
Evaporating Pan.
No. 28,570. Patented June 5, 1860.
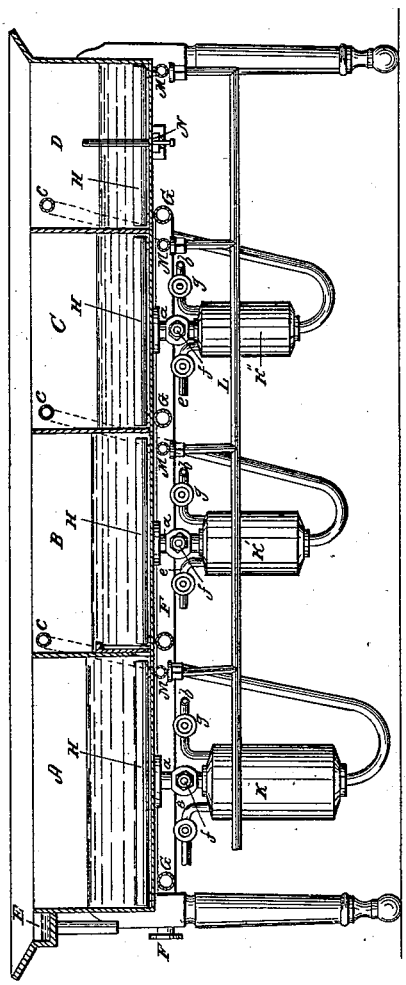
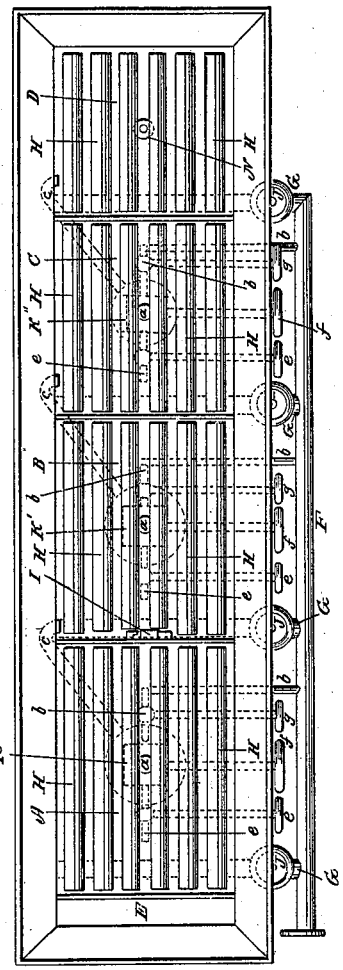

UNITED STATES PATENT OFFICE.

W. H. GILBERT, OF BAYOU GOULA, AND H. O. AMES, OF NEW ORLEANS, LOUISIANA.

IMPROVEMENT IN APPARATUS FOR EVAPORATING SACCHARINE JUICES.

Specification forming part of Letters Patent No. 28,570, dated June 5, 1860.

*To all whom it may concern:*

Be it known that we, WADE H. GILBERT, of Bayou Goula, in the parish of Iberville and State of Louisiana, and H. O. AMES, of New Orleans, in the parish of Orleans and State of Louisiana, have invented a new and Improved Steam-Train for the Evaporation of Cane-Juice in the Manufacture of Sugar; and we do hereby declare that the following is a full, clear, and exact description of the same, reference being had to the accompanying drawings, forming part of this specification.

In order that the object and nature of our invention may be fully understood, we will, before describing it fully, refer as briefly as possible to the different apparatus for and methods of evaporating cane-juice heretofore used, and explain their defects.

Notwithstanding the various and multiplied mechanical appliances used in sugar-making, there are but two methods of evaporating cane-juice—viz., one by the direct application of fire or flame to kettles or pans, and the other by the introduction of steam into pans either open or *in vacuo*. In what is known as a "kettle-train," employed in the first mode, the smallest kettle, termed the "battery," is situated immediately over the fire, and the largest one, known as the "defecator," is farthest from the fire. As the cane-juice comes from the mill it is directed into the defecator, where lime is added for its defecation. After being boiled and scummed, it is passed forward from one kettle to another in the train for further evaporation and cleansing till it reaches the battery, in which it is concentrated to the sugar-point, and from which it is discharged into the coolers. The proper quantity of lime or "temper" for defecation varies with the nature of the cane-juice. It must be sufficient to effect perfect defecation or very little in excess, and, to maintain this point uniformly, requires great skill and care on the part of the sugar-maker. In all the arrangement of kettles or pans heated by the direct action of the fire or flames it is found practically impossible to preserve an equal temper of the cane-juice from the fact that, after the juice has been limed in the defecator, boiled, and scummed, it has to be passed forward with dippers or buckets to the next pans or kettles of the set for further evaporation and cleansing, and in doing so more or less of the tempered juice must be left in the defecator, it being impossible to thoroughly empty it. It frequently happens at night, or at other times when the attendants are sleepy or careless, that a larger quantity than usual will be left, and on the defecator being filled up with raw juice, and having the usual quantity of lime added, the "liming" or temper will be in excess or "too high," and if the same thing should be repeated the trouble will be increased in the next charge, and considerable damage is thus often occasioned to the quality of a large quantity of sugar. It has been attempted to obviate this imperfection by defecating the cane-juice in separate pans, heated by steam and isolated from the kettle-train. By this only a partial amelioration of the result is effected, for the juice still has to be bucketed from kettle to kettle to keep them all full, or nearly so. The open steam-train has been adopted to a considerable extent as an improvement on the kettle-train. In the ordinary open steam-train the pans are placed at different levels, the defecator the highest and the others successively lower, the battery being the lowest, and the juice is completely discharged from one pan to another by gravitation; but while by this apparatus a perfect defecation can be maintained, the subsequent treatment of the juice in the isolated pans is unfavorable for the perfect cleansing of its impurities, and the sugar produced is in many cases inferior to what is produced in kettles. The reason of this is as follows: After cane-juice has reached a certain density in boiling, it becomes thick and viscid and ceases to throw off its foreign matters. In boiling in kettles which are always on the same level this difficulty is remedied at once by the addition of some less concentrated juice from the next or one of the kettles farther back in the train. This being done, ebullition starts afresh and the cleansing process goes on as before. In the open steam-train, as heretofore arranged, with the pans isolated, no convenient provision is afforded for this transfer of juice, and in consequence the manufacture of sugar by it is so defective that most manufacturers who have adopted it have been compelled to resort to the use of bone-black, vacuum-pans, the centrifugal process, or some other expensive means of obtaining sugar of good quality.

The object of our invention is to so construct and arrange an open steam-train as not only to provide for the proper defecation of the juice in the defecator, but to obviate the above-mentioned defect of the ordinary steam-train; and to this end our invention consists in the connected steam-train, which is described as follows:

Figure 1 is a vertical section of our connected steam-train. Fig. 2 is a plan of the same.

Similar letters of reference indicate corresponding parts in both figures.

A B C D are the pans, represented as consisting of compartments of the same long open tank; but they may be otherwise arranged side by side at the same level, so as to constitute a continuous train, the largest pan, A, which is the defecator, being at one end of the train, and the smallest one, D, which is the battery, being at the other end, and the others being arranged intermediately. At the end of the defecator farthest from the adjacent pan B there is a trough, E, for the reception of the scum gathered from the juice in the defecator. In the lower part of the partition between the defecators and the tank B there is a slide-valve, I, which may be opened to allow all the juice to be discharged from the defecator into the tank B.

F is the main steam-pipe, from which branches G G lead to the pipes H H within the several pans, each branch being fitted with a cock or stop-valve, J, so that steam can be shut off from either pan without interfering with the others. L is the waste-pipe connected with the steam-pipes H H of the several pans by branches M M, for carrying off the water of condensation.

K K' K² are "monte-jus" for passing the juice forward from one pan to another of the series. As the process advances the cylinders of these monte-jus are arranged one under each of the pans A B C, and connected therewith by their inlet-pipes $a\ a\ a$, but each having its discharge-pipe $c$ connected with the next pan of the series, so that the contents of the defecator A may be discharged into B, those of B into C, and those of C into the battery D. These monte-jus are connected by steam-pipes $b\ b\ b$ with the main steam-pipe F and furnished with air-cocks $e\ e\ e$. The pipes $a\ a\ a$ are furnished with stop-cocks $f\ f\ f$, and the pipes $b\ b\ b$ with stop-cocks $g\ g\ g$.

The operation of the train and treatment of the juice are as follows: In starting, the defecator A is charged with raw juice from the mill or juice-boxes, the steam is let on, and when the juice has attained a temperature of about 150° Fahrenheit the proper dose of lime for its defecation is added. As the heat of the juice increases the albuminous matters rise to the top with many impurities in the form of scum, which is skimmed back into the trough E and there allowed to settle. As soon as the juice has been properly defecated the slide-valve I is opened and the defecated juice allowed to run into the pan B until the proper quantity is obtained, when the said valve is closed. Steam is then let onto B, and the boiling and cleansing process begins therein, and the impurities as they rise are brushed back into the defecator, and from thence into the trough E. After the juice has been boiled a short time in the pan B it is discharged by means of the monte-jus K' into the pan C, and the pan B is replenished from the defecator, either through the slide-valve I or the monte-jus K. Steam being then let onto the pan C, the cleansing process proceeds therein as it previously did in B. As the juice in the pan C becomes thick and viscid and does not readily throw off its impurities, a sufficient quantity of less concentrated juice is passed forward to it from the pan B, and ebullition is increased and the cleansing proceeds again actively. The impurities, as they rise in C are brushed back to the pan B, and from thence to the defecator, and thence to the trough E. When the juice has been perfectly cleansed of its mucilage and other impurities in the pan C it is passed forward to the battery D by the monte-jus K², where it is concentrated to the sugar-point, and whence it is discharged by a cock or valve, N, in the bottom into the strike-box. (Not shown.) As soon as the sugar in the battery has been discharged into the strike-box the battery is recharged with sirup from the pan C by the monte-jus K², and that pan replenished from B by the monte-jus K' from the defecator A by the monte-jus K or valve I; and the defecator, as soon as it is completely emptied, and not before, is again supplied from the juice box or mill, and thus the rotation is continued, the pans A, B, and C clarifying and preparing the juice for the battery D.

It will be observed that in the process performed by this apparatus the proper point of liming can always be maintained from the fact that the whole of the juice so defecated in the defecator A is passed forward into the other pans of the series in succession without any admixture with the raw juice, consequently giving to the sugar-maker the means and facility of keeping a uniform temper in the cane-juice from the beginning to the end of the crop, and from the defecator to the battery the corn-juice is treated continuously as a boiling mass, whereby a perfect separation of the albuminous principle can always be obtained before the sirup is concentrated to the sugar-point in the battery; hence, we obviate the imperfect defecation caused by the "too high" liming of the juice in the ordinary fire or kettle train, and the imperfect clarification and cleansing of the juice as in the isolated pans of the ordinary open steam-train, and dispense with the use of bone-black, vacuum-pans, centrifugals, and settling-tanks and obtain the finest quality of brown sugar that can be made. Beside the improved result thus obtained by its use there are advantages in the working of our connected steam-train, to wit: Its management is extremely simple, and it is always under the complete control of the sugar-maker, and the labor of bucketing is dispensed with, for by opening and closing the cocks constant intercommunication can be kept up between the pans, and the juice can be thrown at will from one to another to facilitate the cleansing as it becomes thick and viscid, and by providing for foaming the pans but little brushing is required to cleanse the juice completely. The connected steam-train also economizes both time and fuel, for the necessary manipulations from one pan to another can be performed more expeditiously, and the loss of heat which attends the process in other apparatus is obviated.

We do not claim separately any of the parts of our connected steam-train; but

What we claim as our invention, and desire to secure by Letters Patent, is—

The connected steam-train, composed of a series of open pans arranged and connected by monte-jus, substantially as and for the purposes herein specified.

W. H. GILBERT.
H. O. AMES.

Witnesses:
JOHN M. JONES,
THOMAS HARTIGAN.